Figure 1:
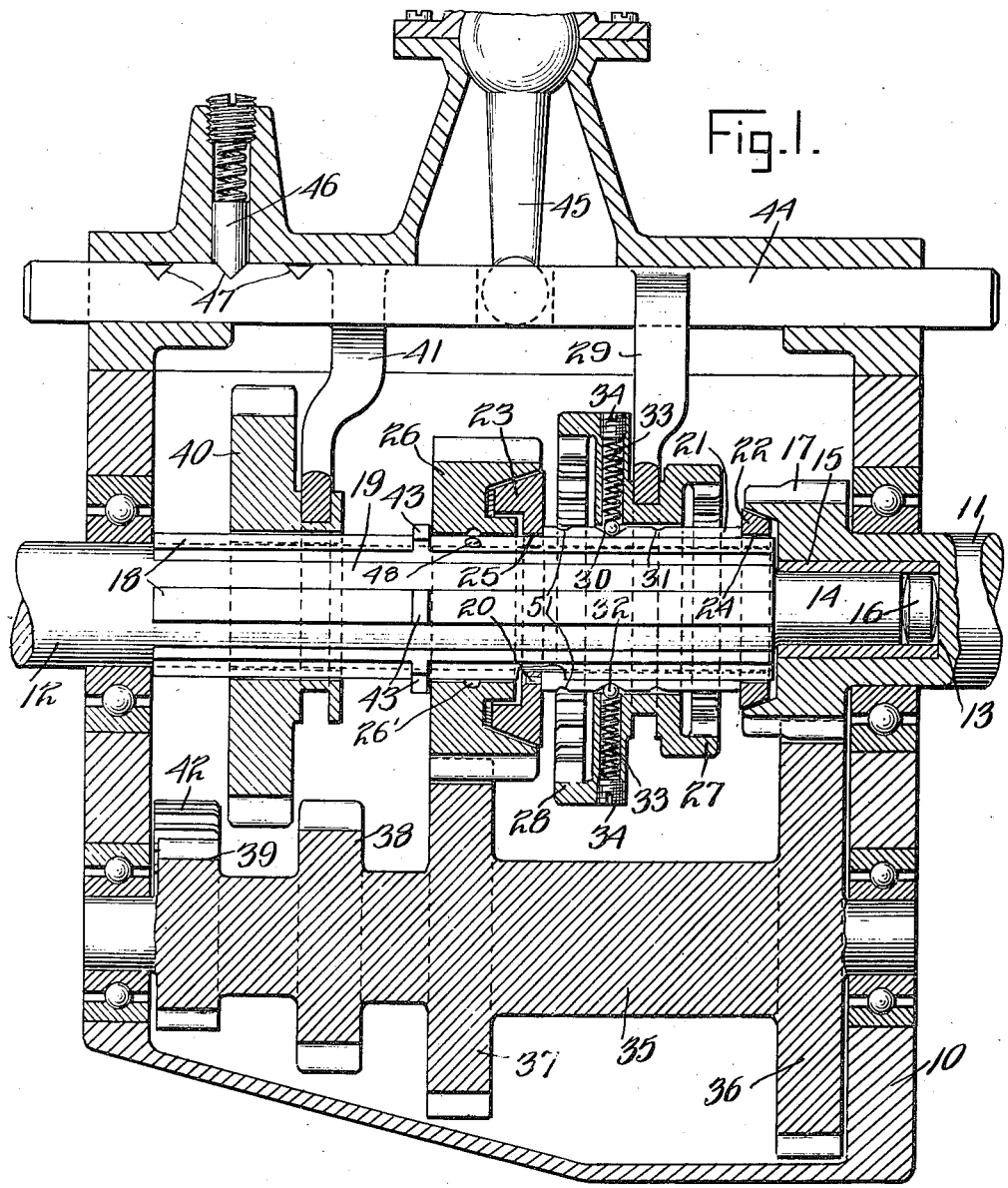

Oct. 8, 1929.                J. F. GAYLORD                1,730,362
                          VARIABLE SPEED CLUTCH
                          Filed Sept. 15, 1927              2 Sheets-Sheet 1

Inventor
John F. Gaylord
By
Attorney

Oct. 8, 1929.  J. F. GAYLORD  1,730,362
VARIABLE SPEED CLUTCH
Filed Sept. 15, 1927  2 Sheets-Sheet 2
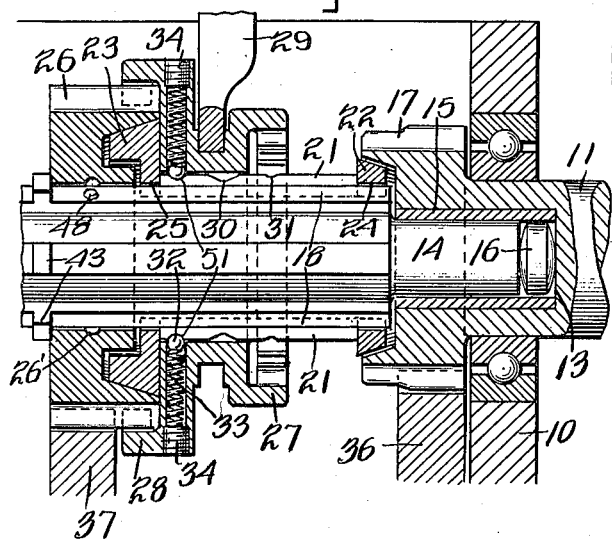
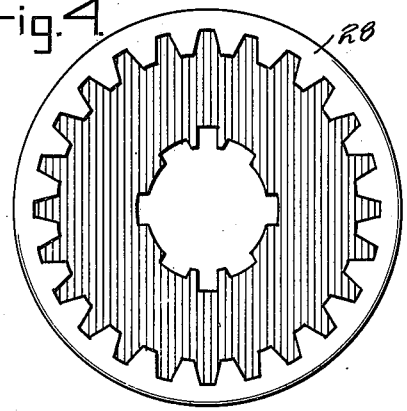
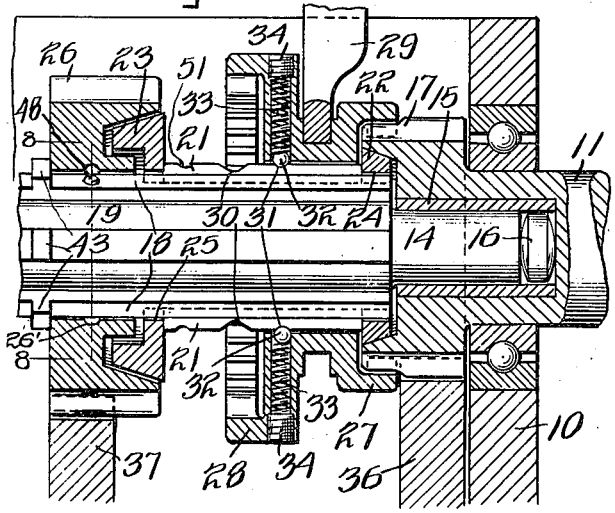
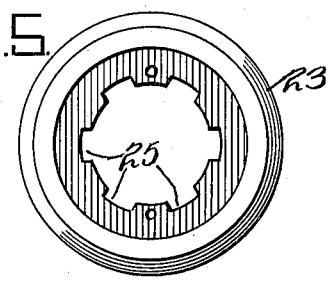
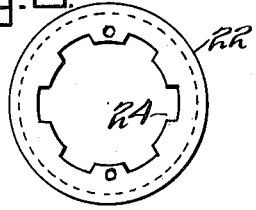
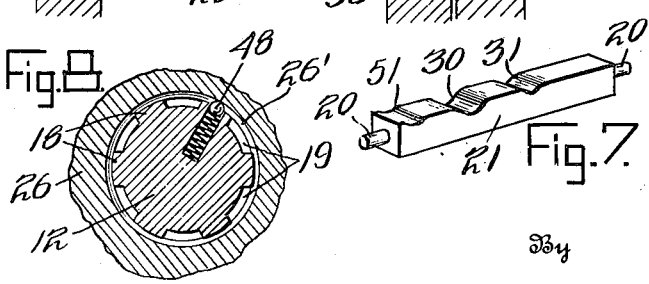
Inventor
John F. Gaylord
By
Attorney Patented Oct. 8, 1929

1,730,362

UNITED STATES PATENT OFFICE

JOHN FLETCHER GAYLORD, OF FLINT, MICHIGAN

VARIABLE-SPEED CLUTCH

Application filed September 15, 1927. Serial No. 219,697.

My invention relates to clutches for variable speed transmissions for automobiles or the like and particularly to that type of transmission in which the gears are constantly engaged and is an improvement over that shown in my Patent No. 1,659,525, granted February 14, 1928.

It is an object of the invention to provide a more durable and simplified structure as well as one more efficient in operation and in which the operation of changing gears may be accomplished with minimum effort, all as will be hereinafter more particularly described and claimed.

Referring to the accompanying drawings which are made a part hereof and on which similar reference characters indicate similar parts, Figure 1 is a longitudinal vertical section illustrating the application of my invention, certain of the parts being shown in elevation, Figure 2, a similar fragmentary view with the parts in position for intermediate forward speed, Figure 3, a similar fragmentary detail view with the parts in position for high speed, Figure 4, a side elevation of the second or intermediate speed crown gear, Figure 5, a side elevation of the second or intermediate speed clutch member, Figure 6, an elevation from the opposite side of the high speed clutch member, Figure 7, a detail perspective of one of the keys, and Figure 8, a section on the line 8—8 of Fig. 3.

In the drawings reference character 10 indicates a transmission case or housing in which are mounted a motor or driving shaft 11 and a driven shaft 12, the motor shaft 11 being provided with a socket or recess 13 in its end into which the reduced end 14 of the driven shaft 12 extends. A bearing sleeve 15 is preferably mounted in the recess 13 about the reduced end of said driven shaft and a thrust-bearing 16 is preferably provided between the end of the driven shaft and the inner end of the recess 13 for accommodating the end thrusts of the respective shafts.

The extremity of the motor or driving shaft 11 is provided with an external gear 17 disposed within the housing 10, such gear being carried in a manner to insure positive rotation therewith. The driven shaft 12 is supported in axial alinement with the driving shaft and is provided with upstanding longitudinally disposed ribs or splines 18 having slots or recesses 19 extending longitudinally between the same. A pair of keys 21 are slidably mounted in the diametrically opposed slots or recesses 19 and said keys are provided with reduced extensions 20 which are riveted to a pair of clutch members 22 and 23 mounted at each end of the keys 21 adjacent the gears 17 and 26. The clutch members 22 and 23 are provided with recesses 24 and 25 formed complementarily relative to the ribs 18 on the driven shaft whereby the clutch members 22 and 23 are slidably but non-rotatably mounted on the driven shaft. The clutch member 22 is provided with a beveled or inclined peripheral face for cooperation with a complementary beveled face formed in the side of the gear 17. Likewise the clutch member 23 is provided with a beveled or inclined peripheral face for cooperation with a complementary beveled face formed in the side of a gear 26 which is rotatably mounted on the shaft 12. The gear 26 is provided with an internal annular groove 26' which acts in conjunction with a spring pressed ball 48 to hold the gear in the proper position on the shaft 12. The beveled peripheral surfaces of the clutch members 22 and 23 taper inwardly from the adjacent sides of said clutch members so that when they are moved in opposite directions longitudinally of their supporting shaft they will frictionally engage their respective gears for synchronizing the movement between each clutch member and its cooperating gear when no load is being carried by the driven shaft.

In order to positively lock the gears 17 and 26 to the driven shaft 12, when they have been caused to rotate in synchronism therewith by means of the clutch members 22 and 23, I provide a gear drive lock which comprises a pair of oppositely disposed internally toothed clutch members 27 and 28 provided with slots for the reception of the ribs or splines 18 and the short keys 21, said internally toothed clutch members being integrally formed or otherwise maintained in spaced relation and slidably but non-rotatably mounted upon the driven shaft 12, the smaller forward internally toothed clutch member being of a size to directly cooperate with or engage the peripheral teeth of the gear 17 on the driving shaft in order to effect a direct drive and the larger rear internally toothed clutch member being of a size to cooperate with or directly engage the peripheral teeth of the loosely mounted gear 26 for causing the same to rotate in synchronism with the driven shaft 12. A yoke 29 is provided for shifting the internally toothed clutch members longitudinally into cooperation with their respective gears in order to effect the clutching operations.

In order to cause the respective clutch members to engage their respective gears in advance of the positive locking together of the members 17, 27 and 26, 28, I provide recesses or depressions 30, 31 and 51 in each of the keys 21 for cooperation with balls 32 urged radially inwardly by means of radially disposed springs 33 mounted in recesses in the internally toothed clutch member 28, screw plugs 34 being provided for adjusting the tension of the springs and for holding them in proper position.

As shown in Fig. 1, the balls 32 rest in the recesses 30 when the parts are in neutral position, in the depressions or recesses 31 when the parts are in position for direct drive or high gear and in the recesses 51 when the parts are in position for second gear. When the balls 32 rest in the depressions 30 in the keys 21 and the yoke 29 is shifted for changing the gears, the tension of the springs 33 cause the keys to be moved longitudinally in their slots until they press the respective clutch member 22 or 23 to which they are attached into engagement with its cooperating gear and synchronize the rotative movement of the shaft 12 and the respective gear to which it is clutched. Continued movement of the yoke 29 will cause the balls 32 to ride or snap out of the depressions and cause a quick engagement of the internally toothed clutch member with the respective gear to which it is being locked. At the same time the inactive clutch member 22 or 23 will be withdrawn from engagement with its respective gear and prevent unnecessary friction and consequent wear on the parts as well as simplify synchronization.

An auxiliary or stub shaft 35 is mounted in the housing 10 below the driven shaft in parallel relation thereto and has fixed thereon at its forward end a large gear 36 which is constantly in mesh with the gear 17 fixed on the driving or motor shaft and by means of which the auxiliary or stub shaft will be constantly rotated from the motor or driving shaft.

In order to produce an indirect drive or a drive by means of which the ratio between the driving and driven shafts is varied, I provide a second gear 37 fixed on the stub shaft 35 which gear is constantly in mesh with the loosely mounted gear 26 and by means of which intermediate or second speed may be effected. The auxiliary or stub shaft is also preferably provided with fixed gears 38 and 39 by means of which low and reverse speeds may be accomplished by means of a gear 40 splined on the driven shaft and slidable by means of a yoke 41 into engagement with the gear 38 for effecting low gear, and slidable into engagement with an intermediate gear 42 which engages the gear 39 for causing a reverse rotation of the driven shaft.

In order to limit the movement of the intermediate or second speed gear 26 on the driven shaft, the ribs or splines 18 are preferably provided with upstanding projections or lugs 43 which cooperate to produce such result.

The shifting yokes 29 and 41 are supported by means of axially movable rods 44 which are movable by means of a gear shift lever 45, a spring pressed pin 46 being adapted to seat in recesses or depressions 47 for maintaining the rods 44 in definite longitudinal positions.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. A clutch for use in variable speed transmissions comprising a rotatable shaft having a plurality of longitudinally disposed splines thereon, lugs on some of said splines, a transmission element loosely mounted on said shaft about said splines and limited in its movement in one direction by said lugs, a clutch member slidably mounted on said shaft and held against rotation by said splines, a body having a clutch face for engagement with said transmission element, and keys associated with said body and frictionally and yieldingly held in position by said clutch member whereby when the same is moved toward clutching engagement said keys will be operated to move said body having the clutch face into frictional engagement with said transmission element, substantially as set forth.

2. The combination of a rotary shaft, a gear rotatably mounted on said shaft, means for holding said gear against axial movement, a member having a clutch face for engagement with said gear, keys slidable longitudinally on said shaft and supporting said member having a clutch face, said keys being provided with longitudinally spaced depressions, a clutch member non-rotatable on said shaft and having resilient means adapted to engage said depressions, and means for sliding said clutch member longitudinally of the shaft for causing the engagement of the same with said gear, the resilient means engaging the keys being adapted to force them endwise for causing the engagement of the member having the clutch face and the gear for synchronizing the rotation of the shaft and gear, the pressure of the resilient means upon the keys determining the amount of pressure exerted between the member having a clutch face and the gear and said resilient means being adapted to yield to permit the clutch member to snap into engagement with said gear, substantially as set forth.

3. The combination of a rotary shaft, a gear rotatably mounted on said shaft, a frictional clutch member engageable with said gear, keys longitudinally slidable on said shaft, and supporting said frictional clutch member, a second clutch member slidable over said keys into engagement with said gear, means carried by said second clutch member resiliently engaging said keys, and means for shifting said second clutch member, whereby said keys will be moved longitudinally along the shaft under the action of the resilient means to bring the frictional clutch member into engagement with the gear, said resilient means being adapted to yield upon the application of sufficient pressure and permit the direct engagement of the second mentioned clutch member and the gear, substantially as set forth.

In witness whereof, I have hereunto set my hand at Flint, Michigan, this 7th day of September, A. D. nineteen hundred and twenty-seven.

JOHN FLETCHER GAYLORD.